(12) United States Patent
Wilkes (10) Patent No.: US 7,761,449 B2
(45) Date of Patent: Jul. 20, 2010

(54) SELF-DISENTANGLING DATA STORAGE TECHNIQUE

(75) Inventor: John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2438 days.

(21) Appl. No.: 09/927,163

(22) Filed: Aug. 9, 2001

(65) Prior Publication Data

US 2003/0033051 A1     Feb. 13, 2003

(51) Int. Cl.
*G06F 7/00* (2006.01)
(52) U.S. Cl. ............... 707/736; 707/758; 707/657
(58) Field of Classification Search ........... 707/1–3, 707/200–205, 10, 736, 758, 657; 717/161, 717/173, 184, 216, 114, 162, 165, 203; 365/49; 714/114, 162; 709/217, 328
See application file for complete search history.

(56) References Cited

U.S. PATENT DOCUMENTS

| | | | | |
|---|---|---|---|---|
| 5,276,867 | A * | 1/1994 | Kenley et al. | 707/204 |
| 5,530,899 | A * | 6/1996 | MacDonald | 707/E17.005 |
| 5,566,331 | A * | 10/1996 | Irwin et al. | 707/10 |
| 5,574,898 | A * | 11/1996 | Leblang et al. | 707/1 |
| 5,649,200 | A * | 7/1997 | Leblang et al. | 717/122 |
| 5,659,743 | A * | 8/1997 | Adams et al. | 707/205 |
| 5,813,009 | A * | 9/1998 | Johnson et al. | 707/100 |
| 5,907,672 | A * | 5/1999 | Matze et al. | 714/8 |
| 5,978,815 | A * | 11/1999 | Cabrera et al. | 707/204 |
| 6,002,411 | A * | 12/1999 | Dye | 345/542 |
| 6,014,674 | A * | 1/2000 | McCargar | 707/202 |
| 6,018,744 | A * | 1/2000 | Mamiya et al. | 707/104.1 |
| 6,021,408 | A * | 2/2000 | Ledain et al. | 707/8 |
| 6,047,294 | A * | 4/2000 | Deshayes et al. | 707/204 |
| 6,075,382 | A * | 6/2000 | Tournier | 326/83 |
| 6,078,933 | A * | 6/2000 | Szalwinski | 707/204 |
| 6,202,070 | B1 * | 3/2001 | Nguyen et al. | 707/104.1 |
| 6,321,254 | B1 * | 11/2001 | Meyer et al. | 709/213 |
| 6,330,572 | B1 * | 12/2001 | Sitka | 707/205 |
| 6,370,631 | B1 * | 4/2002 | Dye | 711/170 |
| 6,401,241 | B1 * | 6/2002 | Taylor | 717/174 |
| 6,405,219 | B2 * | 6/2002 | Saether et al. | 707/201 |
| 6,453,325 | B1 * | 9/2002 | Cabrera et al. | 707/204 |
| 6,519,612 | B1 * | 2/2003 | Howard et al. | 707/3 |

(Continued)

OTHER PUBLICATIONS

Raymond A. Lorie—"Long Term preservation of Digital Information"—Proceedings of the 1st ACM/IEEE-CS Joint Conference on Digital Libraries—2001 (pp. 346-352).*

(Continued)

*Primary Examiner*—John Breene
*Assistant Examiner*—Anh Ly (57) ABSTRACT

A self-disentangling data storage technique. Machine-readable data is stored by a data storage media, such as a magnetic tape or floppy drive. A software program for interpreting the data and requests for access to the data is also stored on the data storage media. The program allows the data to be retrieved using multiple different request types and interpreted in accordance with multiple different data formats. The invention overcomes disadvantages of prior storage techniques since the data can be completely or partially reconstructed, as needed. Further, the invention isolates the data storage format from the application used to generate the data so as to minimize problems caused by outdated data storage formats.

31 Claims, 5 Drawing Sheets

U.S. PATENT DOCUMENTS

| | | | |
|---|---|---|---|
| 6,523,102 B1* | 2/2003 | Dye et al. | 711/170 |
| 6,549,916 B1* | 4/2003 | Sedlar | 707/200 |
| 6,581,076 B1* | 6/2003 | Ching et al. | 707/204 |
| 6,587,890 B1* | 7/2003 | Kult et al. | 719/328 |
| 6,591,376 B1* | 7/2003 | VanRooven et al. | 714/36 |
| 6,615,365 B1* | 9/2003 | Jenevein et al. | 714/6 |
| 6,651,074 B1* | 11/2003 | Taylor | 707/204 |
| 6,681,156 B1* | 1/2004 | Weiss | 700/291 |
| 6,772,155 B1* | 8/2004 | Stegelmann | 707/202 |
| 6,778,668 B1* | 8/2004 | Nielsen | 380/201 |
| 6,785,786 B1* | 8/2004 | Gold et al. | 711/162 |
| 6,816,891 B1* | 11/2004 | Vahalia et al. | 711/118 |
| 6,912,645 B2* | 6/2005 | Dorward et al. | 711/216 |
| 6,915,302 B1* | 7/2005 | Christofferson et al. | 707/102 |
| 7,113,962 B1* | 9/2006 | Kee et al. | 707/201 |
| 7,246,177 B2* | 7/2007 | Anton et al. | 709/201 |
| 2001/0042073 A1* | 11/2001 | Saether et al. | 707/203 |
| 2001/0050875 A1* | 12/2001 | Kahn et al. | 365/229 |
| 2001/0054131 A1* | 12/2001 | Alvarez et al. | 711/105 |
| 2002/0002661 A1* | 1/2002 | Blumenau et al. | 707/200 |
| 2002/0065074 A1* | 5/2002 | Cohn et al. | 455/422 |
| 2002/0097277 A1* | 7/2002 | Pitroda | 345/854 |
| 2002/0103816 A1* | 8/2002 | Ganesh et al. | 707/204 |
| 2002/0112134 A1* | 8/2002 | Ohran et al. | 711/114 |
| 2002/0152194 A1* | 10/2002 | Sathyanarayan | 707/1 |
| 2002/0156877 A1* | 10/2002 | Lu et al. | 709/221 |
| 2002/0161784 A1* | 10/2002 | Tarenskeen | 707/200 |
| 2003/0018878 A1* | 1/2003 | Dorward et al. | 711/216 |
| 2003/0130986 A1* | 7/2003 | Tamer et al. | 707/1 |
| 2003/0130999 A1* | 7/2003 | Probert et al. | 707/3 |
| 2003/0177422 A1* | 9/2003 | Tararoukhine et al. | 714/48 |
| 2003/0217083 A1* | 11/2003 | Taylor | 707/204 |
| 2004/0006579 A1* | 1/2004 | Hikita et al. | 707/204 |
| 2005/0044092 A1* | 2/2005 | Adya et al. | 707/100 |
| 2006/0212539 A1* | 9/2006 | Palevich et al. | 709/217 |

OTHER PUBLICATIONS

Gelman et al.—"A Store-and-forward architecture for video-on-demand service"—Communications, 1991, ICC'91—vol. 2 Jun. 23-26, 1991 (pp. 842-846).*

* cited by examiner

SELF-DISENTANGLING DATA STORAGE TECHNIQUE

FIELD OF THE INVENTION

The present invention relates to data storage. More particularly, the present invention relates to retrieval of data from a storage medium for which the data format is not necessarily known.

BACKGROUND OF THE INVENTION

Machine-readable data is generally stored digitally, as a series of logic "ones" and "zeros." For example, such data may be stored using optical, magnetic and/or electronic storage devices which may include, for example, solid-state memory devices, magnetic tape drives and optical or magnetic disk drives and arrays.

Often, it is desired to store a collection of data for later retrieval in case the original version is changed, lost or damaged. For example, a back-up copy of the data may be placed on storage media, such as a magnetic tape or floppy disk. In order for the data to be understood upon retrieval, it is generally necessary to know the format in which the data is arranged. Otherwise, the data will appear to be a random series of ones and zeros without meaning. Thus, standardized formats, such as "CPIO" (CoPy In/Out) and "TAR" (Tape ARchive) may be used for archiving data. These schemes have a drawback in that data access functionality is limited. For example, they generally require that the entire stored data structure be reconstructed. However, under certain circumstances, it may be desired to reconstruct less than the entire data structure.

Another conventional technique for archiving data is to store the data in the same format in which the software application that was used to generate the data stores and uses the data. This approach, however, has a drawback in that such application-specific data formats tend to change over time. Thus, older data formats may not be supported by newer versions of the application software.

A conventional technique for reconstructing data is to append a software routine to the beginning of the original data that reconstructs the entire original data when run over the data. For example, a simple "uncompress" program is often placed at the beginning of a piece of compressed email that is able to decode the compressed format of the email data that follows. This technique has a drawback in that it also generally requires that the entire data structure be reconstructed.

Accordingly, it would be desirable to provide a technique for the storage of machine-readable data that overcomes drawbacks associated with conventional storage and reconstruction techniques. It is to these ends that the present invention is directed.

SUMMARY OF THE INVENTION

The present invention is a self-disentangling data storage technique. Machine-readable data is stored by a data storage media, such as a magnetic tape or floppy drive. A software program for interpreting the data and requests for access to the data is also stored on the data storage media. The program allows the data to be retrieved using multiple different request types and interpreted in accordance with multiple different data formats. The invention overcomes disadvantages of prior storage techniques since the data can be completely or partially reconstructed, as needed. Further, the invention isolates the data storage format from the application used to generate the data so as to minimize problems caused by outdated data storage formats.

In accordance with an aspect of the invention, a method is provided for retrieving data from a data storage media. A program is loaded from the data storage media into a computer system. The program includes at least a first routine for responding to a first request type for access to the data storage media and a second routine for responding to a second request type for access to the data storage media. A request for access to data stored on the data storage media is received and a determination is made as to whether the request is of the first type or the second type. When the request is of the first type, the first routine for accessing the data is called and, when the request is of the second type, the second routine for accessing the data is called. The requested data is then presented. The program may include information about the data, such as a file system directory. The data may be stored on the data storage media as raw data blocks.

The first routine may implement a first set of operations (e.g., including file system operations) while the second routine may implement a second set of operations (e.g., including standardized archival operations such as operations selected from CPIO and TAR). The first request type may include a request for one or more files from a file system. In which case, all or some of the data may be reformatted as a file structure. The second request type may include a request for one or more logical volumes or an image copy of the data. Further, the first request type may be by a first target system type while the second request type may be by a second target system type. In which case, presenting the requested data may include formatting the data in accordance with the target system type.

In accordance with another aspect of the invention, an article of manufacture includes a computer usable medium having data stored thereon and having computer readable program code stored thereon. The computer readable program code includes a first routine for accessing the data in response to a request for access to the data as one or more raw data blocks and a second routine for accessing the data in response to a request for access to the data as a file structure.

In accordance with yet another aspect of the invention, an article of manufacture includes a computer usable medium having data stored thereon and having computer readable program code stored thereon. The computer readable program code includes a first routine for accessing the data in response to a request from a first target system type and a second routine for accessing the data in response to a request from a second target system type.

DETAILED DESCRIPTION OF A PREFERRED EMBODIMENT

Figure 1:
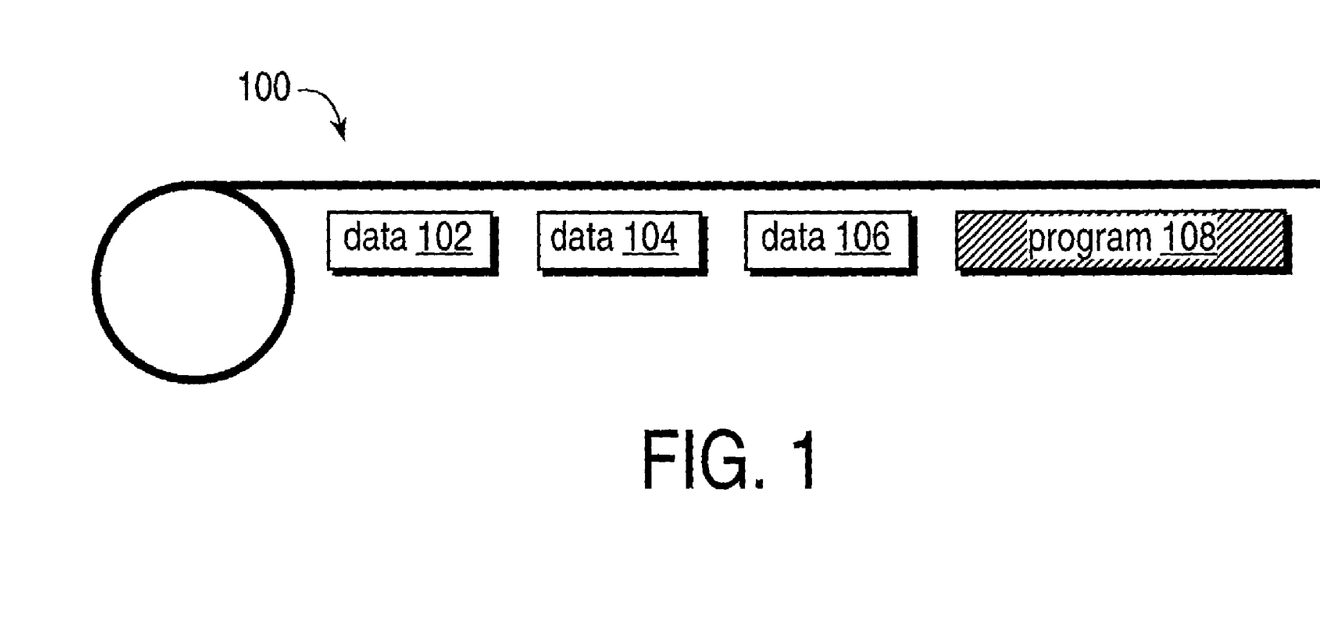
FIG. 1 illustrates a storage media having data and a disentangling program stored thereon in accordance with the present invention.

FIG. 1 illustrates a storage media 100 having data 102-106 and a disentangling program 108 stored thereon in accordance with the present invention. The media 100 may be a magnetic tape, for example. Alternately, the media be of another type such as magnetic disk (e.g., floppy or hard disk) or may use some other data storage technology, such as optical (e.g. CD or DVD) or solid-state techniques (e.g., RAM or DRAM).

The data 102-106 may be stored on the media 100 as an image back-up collection, that is, as raw data blocks that are not specially reformatted for storage. The stored software program 108 may be stored on the media 100 along with the data 102-106 and is preferably located at the beginning of the media 100, preceding the data 102-106. In addition, one or more headers may precede the stored program 108 in order to aid a reader in recognizing the program 108. Alternately, the program 108 may be stored on secondary storage associated with the media 100, such as a "smart chip" built into a magnetic tape cartridge.

The program 108 may include one or more software routines that may be invoked in response to requests for access to the data 102-106 and for interpreting and reformatting the data 102-106. The program 108 may have been compiled prior to storage on the media 100. In which case, it may be loaded and executed without further compilation. Alternatively, the program may be 108 be un-compiled or only partially compiled. In which case, it may be compiled after loading, but prior to execution.

The program 108 may be written in a conventional computer language, such as C, LISP or Java. If partially pre-compiled, the program 108 may include, for example, Java byte codes. If fully compiled, the program 108 may be in the form of "X86" executable code. Languages, such as C, LISP and Java, that have well-publicized and stable virtual machine execution environments, are preferred for the program 108 over others.

The program 108 preferably provides at least two different operations for accessing or presenting the data 102-106 stored on the medium 100. For example, the program 108 may include one or more software routines or application program interfaces (APIs) to accommodate different target systems or different operation sets for accessing the data. Examples of differences in target systems that may be accommodated by the program 108 include different virtual machine architectures, different instruction sets, different computer languages, and different operating system variants. Examples of different operation sets may include standardized operations for archival, such as CPIO and TAR operations, and file system operations. Standardized archival operations include reconstruction of the entire data collection. File system operations include retrieval or generation of a file directory and retrieval of selected directory files.

In addition, the program 108 may include information about the data 102-106 stored on the media 100. This may include, for example, the amount of data 102-106, a description of its contents or a directory of files included in the data 102-106.

Further, the program 108 may perform reformatting or translation of the data 102-106 to present it to an outside entity in another format and may be used to store additional information on the media in the same format as the existing data 102-106. For example, the data 102-106 may be stored as raw data blocks or in accordance with a standard archival format, such as CPIO or TAR. The program 108 may permit access to the data 102-106 using a conventional CPIO or TAR operation and may also present the data 102-106 reformatted as a file system.

Figure 2:
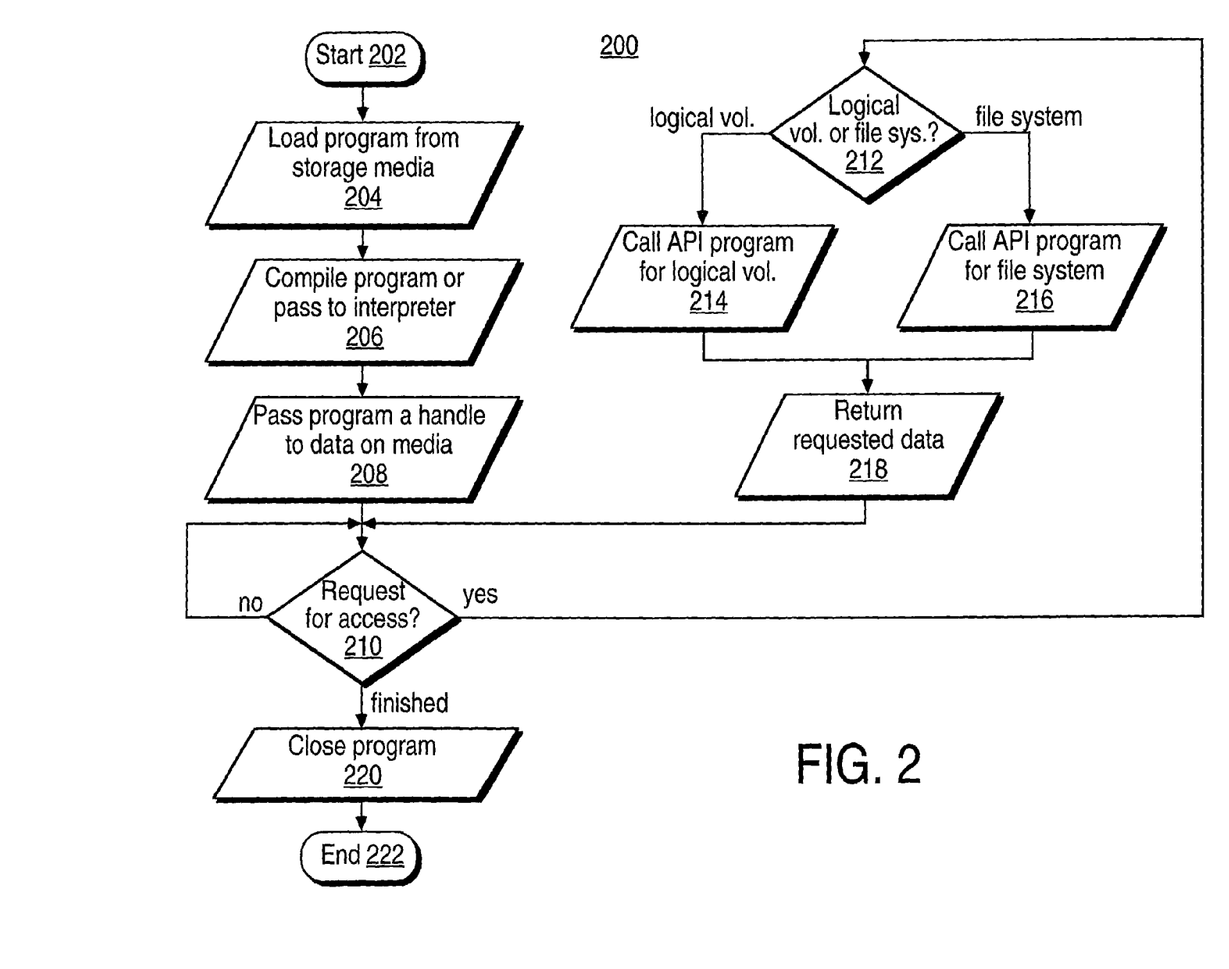
FIG. 2 illustrates a flow diagram for interpreting the data of FIG. 1 in accordance with the present invention.
Figure 3:
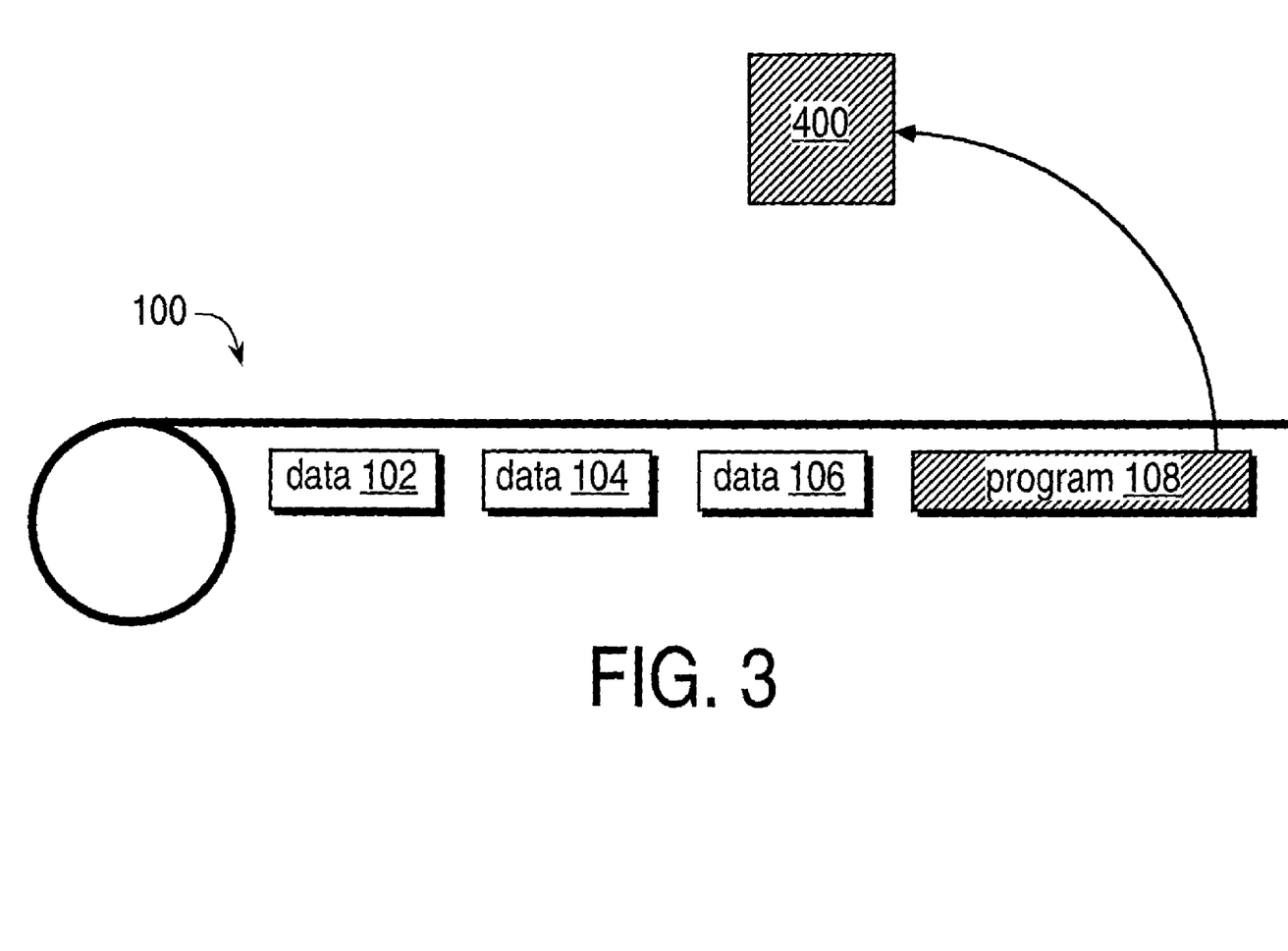
FIG. 3 illustrates the storage media of FIG. 1 in which the stored disentangling program is loaded into a computer system for interpreting the data stored on the storage media.

FIG. 2 illustrates an exemplary flow diagram 200 for interpreting the data 102-106 of FIG. 1 using the program 108 of Figure in accordance with the present invention. Program flow begins in a start state 202. From the state 202, program flow moves to a state 204 in which the program 108 may be retrieved from the storage media 100 and loaded into a computer system for interpreting the data stored on the storage media 100. This is shown in FIG. 3 where the program 108 is loaded into a computer system 400.

Figure 4:
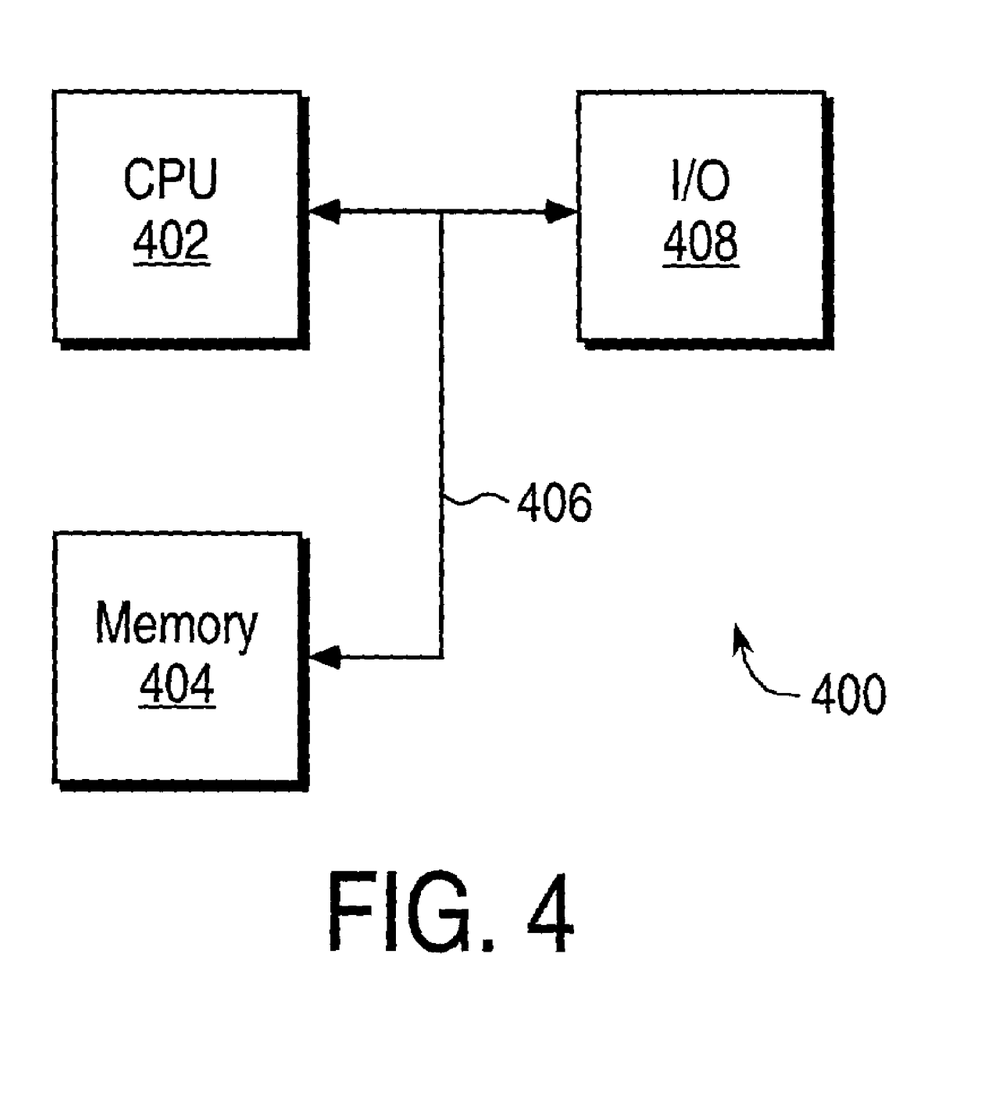
FIG. 4 illustrates a block schematic diagram of a general-purpose computer system which may be used to interpret the data stored on the storage media.

FIG. 4 illustrates a block schematic diagram of a general-purpose computer system 400 by which the present invention may be implemented. The computer system 400 may include a general-purpose processor 402, a memory 404, such as persistent memory (e.g., a hard disk for program memory) and transitory memory (e.g., RAM for storing the device tree 100), a communication bus 406, and input/output devices 408, such as a keyboard, monitor and mouse. The memory 404 may include memory devices such as a magnetic tape reader for reading the storage media 100 of FIG. 1. The computer system 400 is conventional. As such, it will be apparent that the system 400 may include more or fewer elements than shown in FIG. 4 and that other elements may be substituted for those illustrated in FIG. 4.

Referring again to FIG. 2, program flow moves from the state 204 to a state 206. In the state 206, the computer 400 may compile the program 108 and/or pass the program 108 to an interpreter, as necessary. For this purpose, a compiler or interpreter program may also be stored in the memory 404 of the computer system 400.

From the state 206, program flow moves to a state 208 in which a handle may be passed from the media 100 to the computer 400 for use by the program 108 for accessing the data 102-106. This handle may be a tag or reference to the data 102-106 rather than the data 102-106, itself.

Then, in a state 210, a determination may be made as to whether a request has been received for access to the data 102-106. For example, an application program operating on the computer system 400 may require access to some or all of the data 102-106. Alternately, a user may initiate access via the computer 400. Program flow may remain in the state 210 until such a request is received. When a request for access to the data 102-106 is received, program flow moves to a state 212. In the state 212, a determination may be made as to the type of request which was received in the state 210.

The request received in the state 210 may be, for example, one of two principal types. One type of request may be to access the data 102-106 as though the data 102-106 were an image backup or a set of logical volumes. Accordingly, this type of request may assume that the data 102-106 is stored according to a standardized archival format, such as CPIO or TAR. An example of this type of request is a request to reconstruct the entire data collection to another location, such as onto a hard-drive of the computer system 400 (FIG. 4). Another example of this type of request may be to access specified logical blocks (e.g., "the first 50 blocks of logical volume 23") of the data 102-106.

Assuming the request received in the state 210 is to access the data 102-106 as an image back-up or logical volume, then program flow moves from the state 212 to a state 214, in which an application program interface (API) routine may be called that is appropriate to this type of request.

Another principal type of request may be to access the data 102-106 as though the data 102-106 were a file system. An example of this type of request is a request to retrieve a specified file (e.g., by file name: "XXX/YYY"). Another example of this type of request is a request to list the contents of the media 100 as a set of files (i.e. a file directory). A further example of this type of request may be to reconstruct the entire data collection 102-106 as a file system (e.g., to be stored on the hard drive of the computer system 400). Assuming the data 102-106 is stored as raw data blocks, this type of request may require reformatting of the data 102-106 to a file system format.

Assuming the request received in the state 210 is to access the data 102-106 as a file system, then program flow moves from the state 212 to a state 216, in which an application program interface (API) routine may be called that is appropriate to this type of request.

Figure 5:
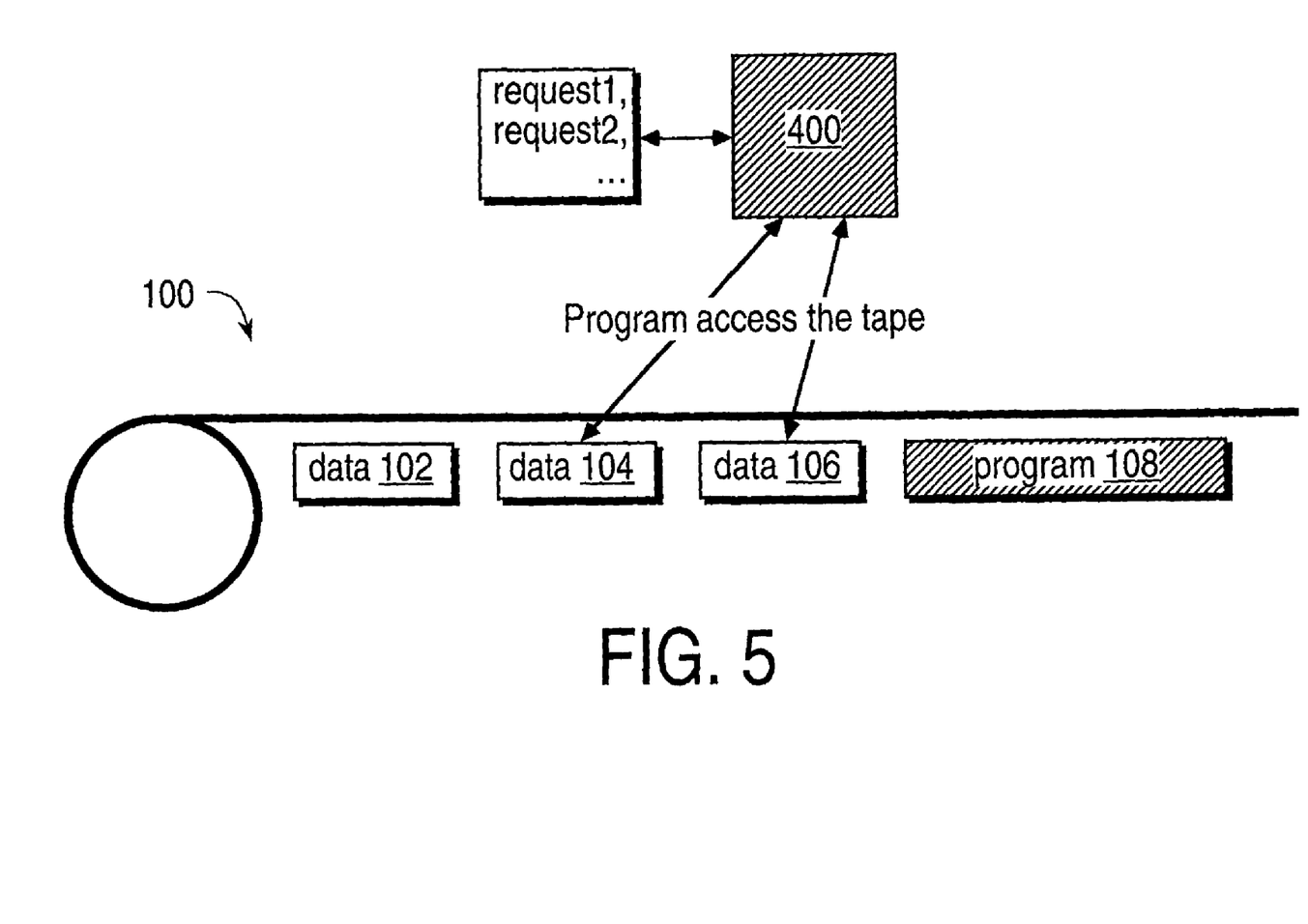
FIG. 5 illustrates the storage media of FIGS. 1 and 2 for which different request types are used for accessing data stored on the media.

From either state 214 or 216, program flow moves to a state 218 in which the requested data may be returned to the requesting application. From the state 218, program flow returns to the state 210 where it awaits another request for access. While in the state 210, one or more additional requests to access the data may be received. In response, program flow returns to the program loop including states 212, 214, 216 and 218. Note that the program 108 (FIG. 1) can accommodate different types of requests. Accordingly, the successive requests received in the state 210 may be any combinations of requests that the program 108 can carry-out. Thus, one request may be for a specific file (a file-system type request), while the next successive request may be for a complete data reconstruction (an image backup request). Thus, as shown in FIG. 5, different request types (e.g., "request1" and "request2") may be received by the computer system 400 for accessing data stored on the media 100.

A specific example of the invention is illustrative. Assume it is desired to create an archival copy of a data collection. Rather than merely write the raw data blocks onto the archival storage media, a software program (e.g., the program 108 written in Java) is also stored on the storage media. This software program may allow the data to be read as both (a) a set of raw data blocks; and (b) a UNIX file system. The API for a set of operations for reading raw data blocks may provide for conventional CPIO or TAR operations. The API for a set of file system operations may be that of a UNIX virtual file system (VFS) interface, which allows the storage media 100 to be used as virtual file system when the program is loaded into memory 404. This would allow future readers of the media 100 to understand its content, even if, for example, the directory format of operating system had changed. By using the VFS interface, it would be possible for a single file to be recovered from an image-based back-up copy (i.e. a raw block copy) without first having to download the entire contents to a hard-disk. For increased performance, additional information, such as a directory map, may be stored on the media 100 prior to the raw data blocks 102-106. This directory map could be hidden during requests using the raw data block API.

Other requests may be received in the state 210. For example, the program may include routines for accommodating different target systems. In which case, requests for access to the data 102-106 that are generated by applications running on the computer 400 may be received in various different forms, depending upon the instruction sets, virtual machine architectures, languages or operating systems that may be run on the computer 400. In response, the retrieved data 102-106 may be presented differently to different target systems, even if essentially the same request is received. The target system type may be identified based on the form of the request. Thus, for example, a request for a specific file stored on the media 100 may return the specified file, but formatted differently depending on the type of target system that made the request.

Once all of the requests to access the data are completed, program flow may move from the state 210 to a state 220. In the state 220, the program 108 (FIG. 1) may be closed. Then, program flow may terminate in a state 222.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of retrieving data from a data storage media comprising:
loading a program from the data storage medium into a computer system, the program including at least a first routine for responding to a first request type for access to data stored on the data storage medium and a second routine for responding to a second request type for access to the same data stored on the data storage medium, the data being stored in accordance with an archival format;
receiving a request for access to data stored on the data storage medium;
determining whether the request is of the first type or the second type;
calling the first routine for accessing the data when the request is of the first type and calling the second routine for accessing the data when the request is of the second type; and
presenting the requested data, wherein the requested data is presented by the second routine in the archival format, and the requested data is presented by the first routine in a file system format.

2. The method according to claim 1, wherein the first routine implements a first set of operations and the second routine implements a second set of operations.

3. The method according to claim 2, wherein the first set of operations includes file system operations.

4. The method according to claim 3, wherein the second set of operations includes standardized archival operations.

5. The method according to claim 4, wherein the second set of operations includes operations selected from CPIO and TAR.

6. The method according to claim 1, wherein the first request type includes a request for one or more files from a file system.

7. The method according to claim 6, wherein the second request type includes a request for one or more logical volumes.

8. The method according to claim 6, wherein the second request type includes a request for an image copy of the data.

9. The method according to claim 1, wherein said presenting includes reformatting, by the first routine, the requested data from the archival format to the file system format.

10. The method according to claim 1, wherein the first request type is by a first target system type and the second request type is by a second target system type.

11. The method according to claim 10, wherein said presenting the requested data includes formatting the data in accordance with the target system type.

12. The method according to claim 1, wherein the program includes information about the data.

13. The method according to claim 12, wherein the information about the data includes a file system directory.

14. The method according to claim 1, wherein the data storage medium is removable.

15. The method according to claim 1, further comprising the first routine reformatting the requested data from the archival format to the file system format.

16. An article of manufacture comprising a computer usable medium having data stored thereon and having computer readable program code stored thereon, the computer readable program code executable by a computer and including a first routine for accessing the data in response to a first type of request for access to the data in an archival format and a second routine for accessing the data in response to a second type of request for access to the data in a file system format, wherein the data stored on the computer usable medium is in the archival format, and wherein the second routine is configured to reformat accessed data in the archival format to the file system format.

17. The article according to claim 16, wherein said second routine supports accessing the data as a logical volume.

18. The article according to claim 16, wherein said first routine supports accessing the data as an image copy.

19. The article according to claim 16, wherein the second routine supports accessing the data as at least one specified file of a file system.

20. The article according to claim 16, wherein the program code includes information about the data stored on the computer usable medium.

21. The article according to claim 20, wherein the information about the data includes a file system directory.

22. The article of manufacture according to claim 16, wherein the computer usable medium is removable.

23. An article of manufacture comprising a computer usable medium having data stored thereon and having computer readable program code stored thereon, the computer readable program code executable by a computer and including a first routine for accessing the data in response to a request from a first target system type and a second routine for accessing the data in response to a request from a second target system type, wherein the request from the first target system type is a request for archival backup data in archival format, and wherein the request from the second target system type is a request for a file of a file system, and wherein the data stored on the computer usable medium is in the archival format.

24. The article according to claim 23, wherein said program code is executable to present the requested data formatted in accordance with the target system type.

25. The article according to claim 24, wherein the data is stored on the computer usable medium as raw data blocks.

26. The article of manufacture according to claim 23, wherein the computer usable medium is removable.

27. The article of manufacture according to claim 23, wherein the second routine is configured to reformat accessed data from the archival format to the file system format.

28. An article of manufacture comprising a computer usable data storage medium having a data stored thereon and having computer readable program code stored on secondary storage associated with the data storage medium, the computer readable program code executable on a computer and including a first routine for accessing the data in response to a request of a first request type and a second routine for accessing the data in response to a request of a second request type, wherein the secondary storage is built into a cartridge for the data storage medium, wherein the data is stored on the data storage medium in an archival format, wherein the request of the first request type is for data in the archival format, and wherein the request of the second request type is for data in a file system format, and wherein the second routine is configured to reformat accessed data from the archival format to the file system format.

29. The article of manufacture according to claim 28, wherein the data storage medium is removable.

30. A method of retrieving data from a data storage media comprising:
    loading a program from the data storage medium into a computer system, the program including at least a first routine for responding to a first request type for access to data stored on the data storage medium and a second routine for responding to a second request type for access to the same data stored on the data storage medium, the data being stored in accordance with an archival format;
    receiving a request for access to data stored on the data storage medium;
    determining whether the request is of the first type or the second type;
    calling the first routine for accessing the data when the request is of the first type and calling the second routine for accessing the data when the request is of the second type; and
    presenting the requested data, wherein the requested data is presented by the second routine in the archival format, and the requested data is presented by the first routine in a file system format,
    wherein the data is stored on the data storage medium as one or more raw data blocks.

31. An article of manufacture comprising a computer usable medium having data stored thereon and having computer readable program code stored thereon, the computer readable program code executable by a computer and including a first routine for accessing the data in response to a first type of request for access to the data in an archival format and a second routine for accessing the data in response to a second type of request for access to the data in a file system format, wherein the data stored on the computer usable medium is in the archival format, and wherein the second routine is configured to reformat accessed data in the archival format to the file system format,
    wherein said first routine supports accessing the data as one or more raw data blocks.

* * * * *